350-174
CROSS REFERENCE
SEARCH ROOM
178/514
Aug. 19, 1958 R. P. BURR 2,848,533
COLOR-IMAGE-REPRODUCING APPARATUS OF THE PROJECTION TYPE
Filed Nov. 26, 1954
X2546
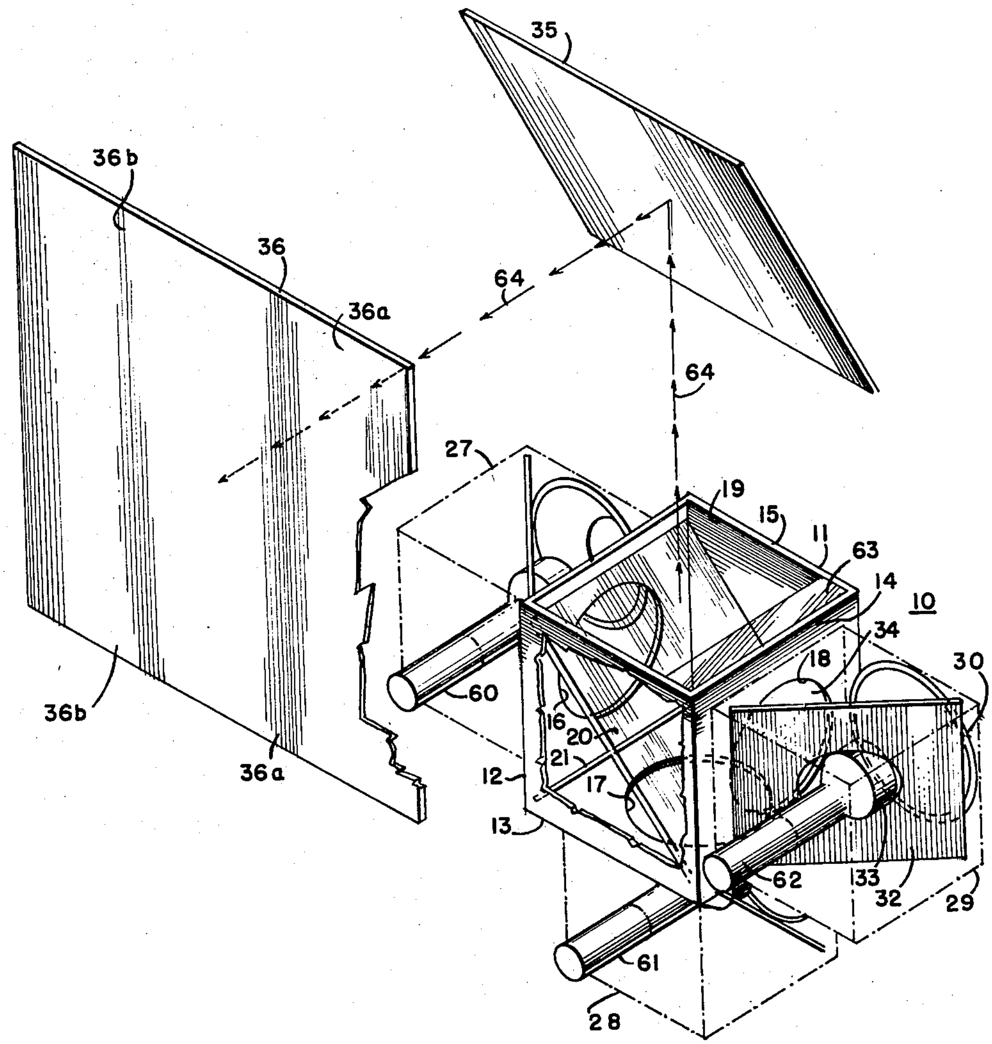

United States Patent Office 2,848,533

Patented Aug. 19, 1958

2,848,533

COLOR-IMAGE-REPRODUCING APPARATUS OF THE PROJECTION TYPE

Robert P. Burr, Huntington, N. Y., assignor to Hazeltine Research, Inc., Chicago, Ill., a corporation of Illinois Application November 26, 1954, Serial No. 471,248

7 Claims. (Cl. 178—5.4)

This invention relates to color-image-reproducing apparatus of the projection type and, more particularly, to color-television projectors for use in color-television receivers.

Various color-television projectors have previously been proposed for superimposing images of different colors displayed on cathode-ray tubes in register as a composite multicolor image on a display screen. Such projectors ordinarily utilize dichroic mirrors in the optical systems thereof. These dichroic mirrors often inherently have light-transmission and light-reflective characteristics which vary with the angle of incidence of the light impinging the mirrors. Also, the mirrors ordinarily comprise several layers of dielectric material which may vary in thickness over the face of the mirrors due to manufacturing tolerances. Either of these factors may cause an undesirable color shading of the composite image projected on the display screen.

It is an object of the present invention, therefore, to provide a new and improved color-image-reproducing apparatus of the projection type which avoids one or more of the limitations of such prior apparatus.

It is another object of thje present invention, therefore, to provide a new and improved color-television projector for superimposing color images in register to be viewed as a composite multicolor image by an observer in which projector undesirable color shading is minimized.

In accordance with a particular form of the invention, color-image-reproducing apparatus of the projection type comprises means for projecting an image to be reproduced on a screen and having an effective non-uniform light-transmission characteristic across the projected image. The apparatus also includes filter means so disposed in the projection path as to be out of focus at the screen for casting a nonuniform diffuse shadow on the screen for compensating the nonuniform characteristic of the projecting means to reduce substantially undesired color shading of the composite image.

For a better understanding of the present invention, together with other and further objects thereof, reference is had to the following description taken in connection with the accompanying drawing, and its scope will be pointed out in the appended claims.

The single figure of the drawing is a perspective view, partly diagrammatic, of color-image-reproducing apparatus constructed in accordance with the invention.

Referring now more particularly to the drawing, a projector constructed in accordance with the invention for superimposing color images in register to be viewed as a composite multicolor image by an observer preferably comprises a rigid frame or box support 11 of suitable metal construction. The box 11 preferably includes three faces or walls 12, 13, 14, and an open face 15 having light-transmission apertures 16, 17, 18, 19, respectively.

The projector 10 includes a plurality of cathode-ray tubes 60, 61, 62 for developing images of different colors, for example, red, green, and blue images, respectively, and individually mounted on rigid optical support units

27, 28, 29 attached to three outer surfaces 12, 13, 14 of the box 11. The frames of the optical support units 27, 28, 29 are diagrammatically represented in broken line construction and the units may, for example, be of similar construction to a type of projection optical unit more fully described in the copending application of W. F. Bailey and R. P. Burr, Serial No. 423,745, filed April 16, 1954, and entitled "Optical Structure for Color-Image-Reproducing Apparatus of the Projection Type."

The projector 10 also includes means including color-responsive means for transmitting the images over a common path to register on a display screen. More particularly, this means comprises the optical system of various lenses and mirrors included in the projector 10, for example, considering for the moment the representative unit 29, that unit preferably includes a light-condensing spherical mirror 30 rigidly disposed opposite the face of the cathode-ray tube 62 supported by the unit 29. The optical system preferably also includes a plane mirror 32 having an aperture 33 therein for insertion of the cathode-ray tube 62 and fixedly disposed at approximately a 45° angle with respect to the axis of the cathode-ray tube.

The optical system also preferably includes an aspherical lens 34 of conventional type fixedly disposed in the light-transmission aperture of the unit 29 for focusing a primary color image and for transmitting the same to color-responsive means supported by the box 11. This color-responsive means preferably comprises a pair of optical dichroic crossed plane mirrors 20, 21 diagonally and rigidly disposed within the support 11. The mirror 20 may, for example, comprise a red and green light-transmissive and blue light-reflective mirror, while the mirror 21 may, for example, be a blue and green light-transmissive and red light-reflective mirror.

The mirrors 20, 21 are effective to translate and reflect the light incident thereon through the open face 15 of the box 11 to a plane mirror 35 suitably positioned with respect to the projector for reflecting component color images transmitted thereby to a display screen 36 comprising suitable diffusing material.

Due to, for example, the inherent variation of the light-transmission cutoff frequency of the dichroic mirrors 20, 21 with variation of the angle of light incident thereon, the dichroic mirrors have a nonuniform light-transmission characteristic across the composite projected image. In accordance with the invention, therefore, the projector also includes filter means 63 disposed in a common projection path of the images represented by the arrows 64 and having an effective complementary nonuniform light-transmission characteristic as projected to the display screen 36 for compensating the nonuniform characteristic of color-responsive means 20, 21 to reduce substantially undesirable color shading of the composite image. The filter means 63 may, for example, comprise a strip of filter material of uniform color partially obstructing the common path and disposed sufficiently far from the cathode-ray tubes and the display screen as to be out of focus as projected to the display screen for casting a diffuse shadow on the display screen which compensates the nonuniform characteristics of the dichroic mirrors 20, 21.

It will be understood that suitable beam-focus means and beam-deflection means (not shown) are associated with the cathode-ray tubes together with usual signal-input circuits for developing images on the cathode-ray tube faces. The beam-focus and beam-deflection means may be mounted in the manner described in the above-mentioned copending application of Bailey and Burr or in the copending application of John R. White, Serial No. 469,942, filed November 19, 1954, and entitled "Color-Image-Reproducing Apparatus."

Considering now the operation of the projector, when the image rasters of the cathode-ray tubes are scanned by the cathode-ray beams thereof, the angle of light incident on the dichroic mirrors varies accordingly. The variation of the angle of incidence is effective to cause a variation of the cutoff frequency of light transmission and light reflection by the mirrors. This variation of cutoff frequency causes in the absence of the filter 63 an undesirable color shading of the composite image on the display screen. For example, the composite image on the display screen may appear of a magenta shade at one end 36*a* thereof as compared with the other end 36*b*. In this event, the filter 63 may be attached to the box 11 in the manner represented in the drawing and preferably comprises a strip of saturated green light-transmissive gelatin material. Since this filter strip only partially obstructs the light-transmission path, and since it is out of focus as projected to the display screen, it casts a green shadow of varying intensity from the region 36*b* to the region 36*a* of the display screen. This green shadow is more intense at the region 36*a* because the region 36*a* is more directly aligned with the filter 63, that is, a greater portion of light focused on region 36*a* passes through the filter 63 than light focused on region 36*b*.

Since green is the complementary color to magenta, the resultant effect of the green shadow and the magenta shading is a neutral or gray cast of uniform intensity on the display screen. This uniform gray light merely changes the brightness level and is unobjectionable as compared with undesirable color shading.

It will be understood that for some applications it may be desirable to use other forms of filters, for example, a filter strip with a serrated edge to augment the diffusion of the shadow on the display screen.

From the foregoing description it will be apparent that a projector constructed in accordance with the invention has the advantage of reducing substantially undesirable shading of the composite image displayed on a screen.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-image-reproducing apparatus of the projection type for a color-television receiver comprising: means including a plurality of cathode-ray tubes for projecting an image to be reproduced on a screen and having an effective nonuniform light-transmission characteristic across the projected image; and filter means so disposed in the projection path as to be out of focus at the screen for casting a nonuniform diffuse shadow on the screen for compensating said nonuniform characteristic of said projecting means to reduce substantially undesirable color shading of the projected image.

2. A color-television projector for superimposing color images in register to be viewed as a composite multicolor image by an observer comprising: a plurality of cathode-ray tubes for developing images of different color; means including color-responsive means for transmitting said images over a common projection path to register on a display screen; said color-responsive means having a nonuniform light-transmission characteristic across the composite projected image; and filter means disposed in said common path for producing a complementary nonuniform light-transmission characteristic as projected to the display screen for compensating said nonuniform characteristic of said color-responsive means to reduce substantially undesirable color shading of the composite image.

3. A color-television projector for superimposing three color images in register to be viewed as a composite multicolor image by an observer comprising: a pair of intersecting dichroic elements; three cathode-ray tubes positioned with their screens adjacent different ones of the dihedral angles of the dichroic elements; optical means for directing images on the cathode-ray tubes into the adjacent dihedral angles so that all emerge in register from the fourth angle; said dichroic elements having an over-all nonuniform light-transmission characteristic across the composite projected image; and filter means disposed in the fourth dihedral angle for producing a complementary nonuniform light-transmission characteristic as projected to the display screen for compensating said nonuniform characteristic of said dichroic elements to reduce substantially undesirable color shading of the composite image.

4. A color-television projector for superimposing color images in register to be viewed as a composite multicolor image by an observer comprising: a plurality of cathode-ray tubes for developing images of different color; means including color-responsive means for transmitting said images over a common projection path to register on a display screen; said color-responsive means having a nonuniform light-transmission characteristic across the composite projected image; means including a strip of filter material of uniform color disposed in said common path for producing a complementary nonuniform light-transmission characteristic as projected to the display screen for casting a diffuse shadow of gradually varying intensity on the display screen to reduce substantially undesirable color shading of the composite image.

5. A color-television projector for superimposing three color images in register to be viewed as a composite multicolor image by an observer comprising: a pair of intersecting dichroic elements; three cathode-ray tubes positioned with their screens adjacent different ones of the dihedral angles of the dichroic elements; optical means for directing images on the cathode-ray tubes into the adjacent dihedral angles so that all emerge in register from the fourth angle; said dichroic elements having an overall nonuniform light-transmission characteristic across the composite projected image; and means including a strip of filter material disposed in the fourth dihedral angle and partially obstructing the same for producing a complementary nonuniform light-transmission characteristic as projected to the display screen for compensating said nonuniform characteristic of said dichroic elements to reduce substantially undersirable color shading of the composite image.

6. A color-television projector for superimposing color images in register to be viewed as a composite multicolor image by an observer comprising: a plurality of cathode-ray tubes for developing images of different color; means including color-responsive means for transmitting said images to register on a display screen; said color-responsive means having a nonuniform light-transmission characteristic across the composite projected image; and filter means partially obstructing the projection path and disposed sufficiently far from said cathode-ray tubes and said screen as to be out of focus as projected to the display screen for casting a diffuse shadow on said display screen for compensating said nonuniform characteristic of said color-responsive means to reduce substantially undesirable color shading of the composite image.

7. A color-television projector for superimposing color images in register to be viewed as a composite multicolor image by an observer comprising: a pair of intersecting dichroic elements; three cathode-ray tubes positioned with their screens adjacent different ones of the dihedral angles of the dichroic elements; optical means for directing images on the cathode-ray tubes into the adjacent dihedral angles so that all emerge in register from the fourth angle; said dichroic elements having an over-all nonuniform light-transmission characteristic across the composite projected image; and a strip of filter material of uniform color disposed in the fourth dihedral angle and partially obstructing the same and projected out of focus to the display screen for casting a diffuse shadow of gradually varying intensity on the display screen to reduce substantially undersirable color shading of the composite image.

References Cited in the file of this patent

UNITED STATES PATENTS

| | | |
|---|---|---|
| 2,354,108 | Flemming | July 18, 1944 |
| 2,589,930 | Dimmick | Mar. 18, 1952 |